(No Model.)

M. ODGERS.
METAL SAW.

No. 530,793. Patented Dec. 11, 1894.

Witnesses:
Hamilton D. Turner
Alex. Barkoff

Inventor:
Matthew Odgers
by his Attorneys
Howson & Howson

UNITED STATES PATENT OFFICE.

MATTHEW ODGERS, OF PHILADELPHIA, PENNSYLVANIA, ASSIGNOR TO THE HENRY DISSTON & SONS, INCORPORATED, OF SAME PLACE.

METAL-SAW.

SPECIFICATION forming part of Letters Patent No. 530,793, dated December 11, 1894.

Application filed April 21, 1893. Serial No. 471,254. (No model.)

*To all whom it may concern:*

Be it known that I, MATTHEW ODGERS, a citizen of the United States, residing in Philadelphia, Pennsylvania, have invented certain Improvements in Metal-Saws, of which the following is a specification.

The object of my invention is to so construct a metal cutting saw that the teeth can be readily made and adjusted in place and can be detached for repairs or regrinding, and this object I attain in the following manner, reference being had to the accompanying drawings, in which—

Figure 1:
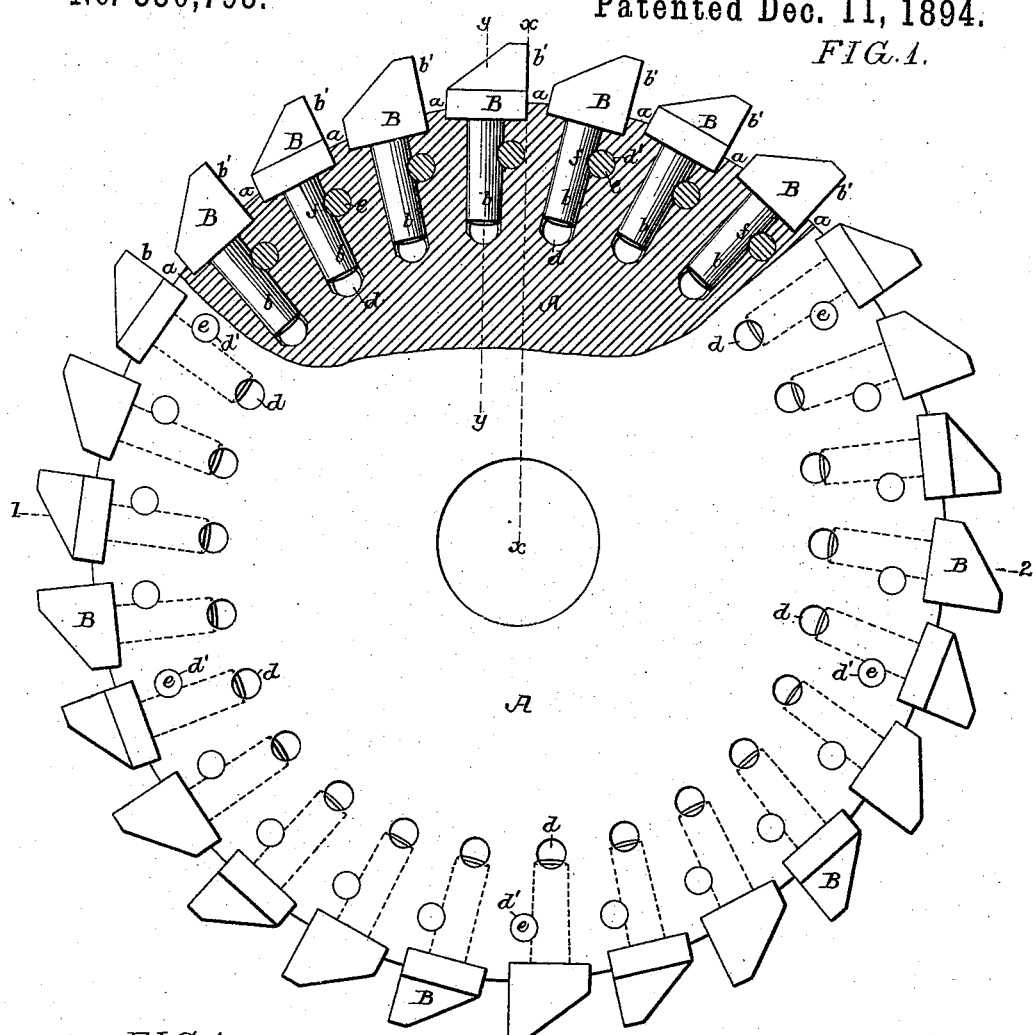
Figure 4:
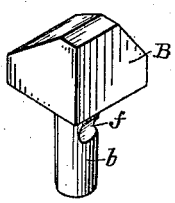
Figure 3:
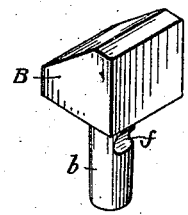
Figure 2:
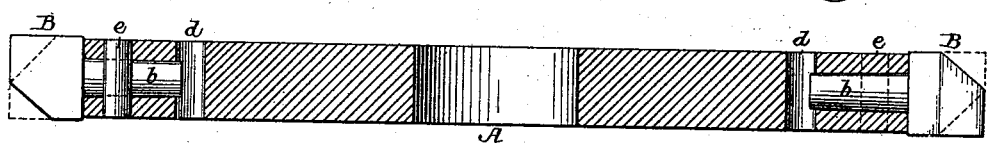

Figure 1, is a side view, partly in section, of a milling cutter or saw illustrating my invention. Fig. 2, is a section on the line 1—2, Fig. 1; and Figs. 3 and 4, are perspective views of the teeth detached.

Heretofore in the manufacture of metal cutting saws or milling tools, the teeth formed part of the saw blade or body of the tool, so that if by any accident one or more of the teeth became broken the whole saw must be condemned.

A is the blade or body of the saw or milling cutter adapted to be mounted on a suitable mandrel. In the periphery of this blade are a series of sockets in which are mounted the shanks $b$ of the detachable teeth B. The heads of the teeth have square bases, in the present instance, which fit snugly between the ribs $a$ on the blade A, whereby the teeth are held in position and are prevented from turning. The front face $b'$ of each tooth is on the radial line $x$ and the back of the tooth is beveled as shown in Fig. 1. The sockets in the periphery of the blade for the shanks of the teeth are formed on lines $y$—parallel with the radial line $x$—so that the face of each tooth will be on a radial line, and the shanks will be parallel with, but in the rear of the faces. By this arrangement the teeth are cheaply made and when once placed in position are ready to cut without further adjustment.

A series of transverse holes $d$ are formed in the blade A into which the ends of the shanks of the teeth pass, so that a tool can be inserted into these holes to start the teeth so that they can be readily removed. Locking pins $e$ are driven into orifices $d'$ in the saw blade, and these orifices are so drilled as to cross the shanks of the teeth, which are cut away at $f$ to align with the orifices. Hence, when the pins are driven in they lock the teeth to the blade.

As shown in Fig. 2, the heads of the teeth extend over each side of the blade, being slightly wider than the blade, so that the blade itself will be clear of the kerf; and in some instances I bevel one side of each tooth as in Fig. 4, the bevel of every other tooth being on one side and the bevel of the alternate teeth being on the opposite side as shown in Figs. 1 and 2, thus giving a "set" to the saw.

It will be understood that in metal sawing or milling the teeth wear away very rapidly while there is no perceptible wear upon the blade. By the construction above described the saws are cheaply manufactured as the teeth can be made separate from the blade.

I claim as my invention—

1. The combination of a metal cutting saw having sockets in its periphery and ribs alternating with the sockets, with detachable saw teeth adapted to said sockets and ribs, said teeth having square bases and beveled at the back and some of the teeth being beveled also on one side while others are beveled on the opposite side, substantially as described.

2. The combination in a metal cutting saw, of a blade having a series of ribs on its periphery, sockets between said ribs, transverse orifices crossing the sockets, detachable teeth having squared heads adapted to fit between the ribs, and shanks entering the sockets, and securing pins adapted to the transverse orifices for locking the teeth to the blade, substantially as described.

In testimony whereof I have signed my name to this specification in the presence of two subscribing witnesses.

MATTHEW ODGERS.

Witnesses:
HENRY HOWSON,
JOSEPH H. KLEIN.